United States Patent [19]
Johnston, Jr.

[11] 3,943,302
[45] Mar. 9, 1976

[54] ELECTRON BEAM RECORDING IN THICK MATERIALS
[75] Inventor: Loren Bainum Johnston, Jr., Princeton, N.J.
[73] Assignee: RCA Corporation, New York, N.Y.
[22] Filed: Feb. 23, 1973
[21] Appl. No.: 335,024

[30] Foreign Application Priority Data
Apr. 19, 1972 United Kingdom............... 18040/72

[52] U.S. Cl................... 179/100.4 C; 179/100.3 A
[51] Int. Cl.²......................................... G11B 11/12
[58] Field of Search.............. 179/100.4 C, 100.3 A; 96/35.1; 178/6.6 B, 6.6 TP

[56] References Cited
UNITED STATES PATENTS
2,511,121   6/1950   Murphy....................... 179/100.4 C
2,559,505   7/1951   Hillier.......................... 179/100.4 C
3,113,896   12/1963  Mann................................... 96/35.1
3,544,790   12/1970  Brown.................................. 96/35.1
3,842,217   10/1974  Clemens....................... 179/100.1 B Primary Examiner—Stanley M. Urynowicz, Jr.
Attorney, Agent, or Firm—Eugene M. Whitacre; Stephen Siegel; William H. Meagher

[57] ABSTRACT

A method of producing a high resolution information storage disc includes the steps of forming a grooved disc coated with an electron beam sensitive material, exposing the coated disc to a signal modulated electron beam, replicating the exposed disc to form a second disc of opposite contour, and utilizing the second disc to produce discs having positive-shaped groove and signal information.

13 Claims, 2 Drawing Figures

ELECTRON BEAM RECORDING IN THICK MATERIALS

BACKGROUND OF THE INVENTION

This invention relates to a method of forming contours representative of high density video information on a disc substrate. More particularly, this invention relates to a method of recording video information on a disc in a manner suitable for subsequently forming replicated discs for playback on a video player.

A system for recording and playback of video information has been described in a copending application Ser. No. 126,772 of Jon K. Clemens filed Mar. 22, 1971 now Pat. No. 3,842,194. As described in the Clemens application, a lacquered surface is deposited on a thick aluminum disc and a continuous spiral groove is cut into the lacquered surface. A first nickel replica is then made of the grooved lacquer surface by depositing nickel over such surface and thereafter separating the nickel coating from the lacquer. This first nickel replica is a negative reproduction of the original grooved lacquer. A second nickel replica is made of the first replica to form a metal disc that is a positive reproduction of the original grooved lacquer. A relatively uniform coating of electron beam sensitive material, such as a photoresist, is thereafter formed on the second nickel replica.

The photoresist-coated replica is then exposed by a video-signal-modulated beam of a scanning electron microscope which provides exposure of the photoresist in the groove of the disc in correspondence to the video signal information. The photoresist is then developed and the exposed portions of photoresist are removed to form a topography in the groove corresponding to the video signal information. A nickel replication is made of the resultant disc and this replication is utilized to stamp or emboss vinyl records by techniques known in the audio recording art. The vinyl replica is then metalized to make the surface conducting and the metalization is thereafter coated with a dielectric. In playing back the recorded information, a stylus is caused to ride in the dielectric coated groove. This stylus, along with the metalization and dielectric, acts as a capacitor. Capacitance variations in the groove, which correspond to the recorded video information, are then detected electronically to recover the video information.

In the system of the above-described Clemens application, if the photoresist-coated replica is formed with a thin layer of photoresist, that is, the layer is of such thickness as to allow the electron beam to completely pierce the photoresist layer and impinge upon the substrate, subsequent exposure of this photoresist coating by the electron beam can provide a non-uniform topography. A non-uniform topography is formed when exposure of the electron beam sensitive material (photoresist) is inadvertently varied by, for example, uncontrolled reflection of the impinging electron beam off the substrate material. In the exposure of a thin layer of electron beam sensitive material, the substrate upon which this thin material layer is formed is used as a reference plane; that is, the electron beam exposure is adjusted to provide penetration through the electron beam sensitive material to the substrate. When the substrate material is utilized as a reference plane, the depth of the formed topography varies as a function of thickness of the electron beam sensitive material. Since it is difficult to apply a uniformly thin material coating over a grooved substrate, it is difficult to provide a topography having exposed regions formed to a uniform depth. During exposure of the thin photoresist material, the photoresist-piercing electron beam reflects off of the metal substrate. In addition to the exposure by the incident beam, the reflected electrons also expose portions of the photoresist material, increasing the width of the electron-beam inscribed area in accordance with the quantity of reflected electrons. This quantity of reflected electrons varies in accordance with the number of electrons striking the substrate and is related to the material coating thickness at the point of exposure. Electron beam reflection off the substrate material at positions where the photoresist coating is too thin, may overexpose the area causing undercut (pear-shaped) exposures in the photoresist material. Undercut or pear-shaped exposures in the photoresist material make the replication process difficult in that the replicating metal coating that is formed over the exposed photoresist becomes extremely difficult to separate from the photoresist-coated disc without fracturing or otherwise deforming the thin metal coating.

SUMMARY OF THE INVENTION

A method of forming a high resolution information storing medium comprises a first step of forming a first disc having a spiral grooved surface covered at least in part with a continuous coating of electron beam sensitive material. A topography having peaks and valleys representative of information to be stored is formed in the spiral groove by exposing the coated disc to an electron beam which is modulated according to the desired signal information. Portions of the exposed material are then removed such that the valley regions include a residuum of beam sensitive material. The exposed disc is then replicated to form a second disc having grooved topography of opposite contour from that of the first disc wherein the second disc is suitable to produce positive replicas of the first signal modulated groove disc.

A better understanding of the invention can be obtained from the following description when taken in in conjunction with the drawings of which:

FIG. 1 is a flow diagram of the method used in accordance with the present invention; and FIG. 2 is an exaggerated cross-sectional representation of a grooved disc that has been coated with a layer of electron beam sensitive material.

DETAILED DESCRIPTION OF THE INVENTION

Figure 1:
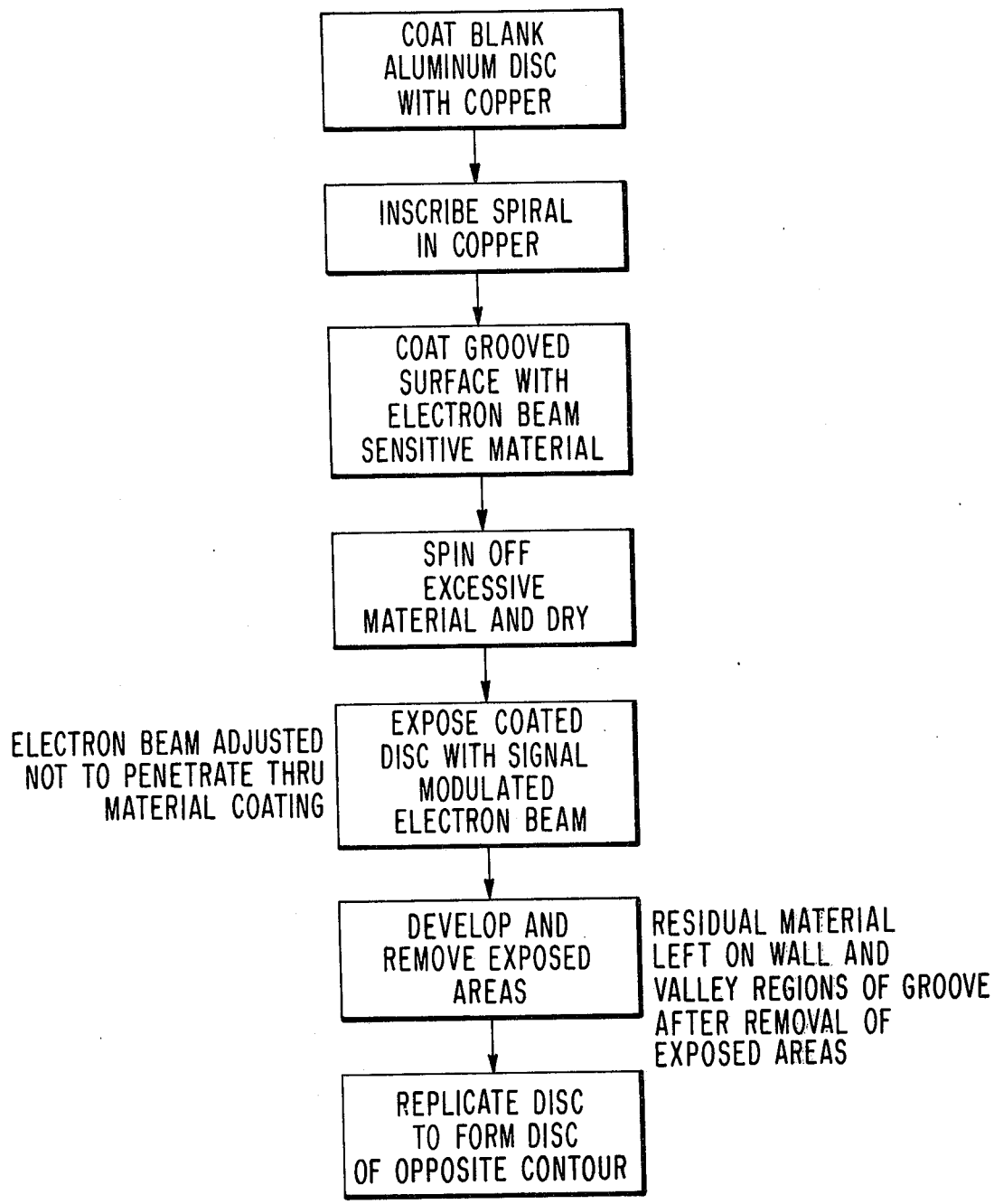
Figure 2:
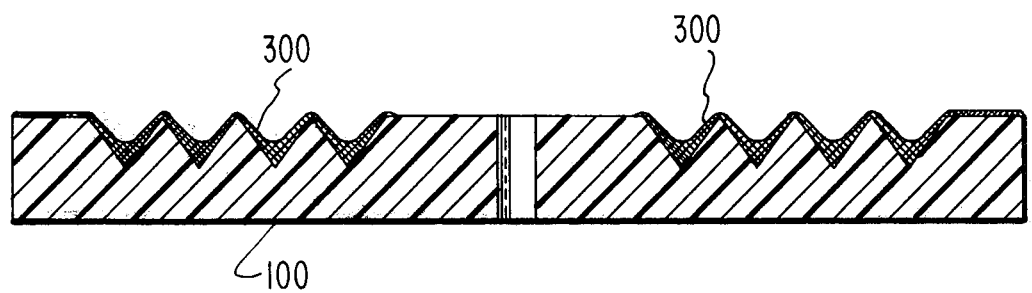

According to one embodiment of the invention, a metal disc having a V-shaped spiral groove on its surface is formed (see 100 on FIG. 2). The spiral groove has a typical pitch of 2000 to 8000 convolutions per inch with an included angle of about 90°. This metal disc may be formed in any of a number of ways. For example, one method of providing a grooved disc includes the steps of first forming an aluminum blank about 14 inches in diameter and one-half inch thick and machining this disc flat to a tolerance of 0.0002 inches. A coating of copper is thereafter formed on the surface of this disc to a thickness of about 0.003 inches. The copper-coated disc is then placed in a jig bore lathe and the copper surface polished to form a smooth, flat disc. A diamond cutting stylus is thereafter utilized to inscribe a spiral groove having a desired pitch of, for example, 4000 convolutions per inch in the copper surface of the disc.

In accordance with the present invention, a layer of electron beam sensitive material or resist material is deposited on the grooved copper surface (see 300 on FIG. 2. A typical electron beam sensitive material that has been successfully utilized in this application is Shipley No. AZ1350 photoresist manufactured by the Shipley Co., Newton, Mass. The electron beam sensitive material may be applied to the disc surface by any one of a number of techniques. One technique that has been utilized is to spin the disc at a rate in the range of about 200 to 2000 rpm (typically at about 450 rpm). An exccess amount of electron beam sensitive material of a viscosity of about 4.5 centipoise is then sprayed on the rotating disc. The disc rotation throws off the exces amount of electron beam sensitive material leaving a continuous coating over the grooved region of the disc.

Coordination of disc rotational velocity and viscosity of the electron beam sensitive material (hereafter referred to as the material coating) is necessary in order to provide a material coating that conforms to a desired groove contour and predetermined thickness in the valley region. If the material coating of the disc is too thick, particularly with a resist material, subsequent exposure of the material coating by the electron beam will inhibit the electron charge caused by the impinging electron beam on the material coated surface from leaking off at the rate of arrival to the associated turntable which is electrically grounded. Residual electron charge on the material coated disc surface acts to defocus the electron beam, preventing high resolution information from being recorded in the disc's coated groove. At the other extreme, a material coating of the disc that is too thin will not provide a sufficient coating for subsequent recording of information along the wall regions of the groove, undesirably reducing the area in which signal information may be recorded. Experimentation has shown that the desired material coating thickness is one that just coats the upper edges or peaks of the groove and is at least 50 percent thicker in the recorded region than the electron beam penetration but not greater than 6 microns thick at the deepest region or valley of the groove. By specifying a minimum material thickness in the recorded region of the groove, electron beam penetration through the material to the substrate is avoided and the detrimental effects of beam reflection off the substrate are eliminated. Consequently, after information has been recorded in the electron beam sensitive material, a residuum of this material will remain below the electron-beam exposed regions. A detailed description of a method of applying electron beam sensitive material such as photoresist to a disc substrate is described in a copending U.S. application in the name of Robert Michael Mehalso et al., Ser. No. 245,657, assigned to RCA Corporation, now U.S. Pat. No. 3,795,534.

If electron beam sensitive material such as the aforementioned Shipley No. AZ1350 photoresist is utilized, particular care should be taken to insure its homogeneity on the surface of the disc prior to exposure by the scanning electron microscope. After application and spin drying of the photoresist material for a period of about ten minutes for a disc having 4000 convolutions per inch, the disc is removed from the turntable and allowed to dry in the open air under standard temperature and humidity conditions for about 7 days. A 7-day drying period has been found desirable to allow excess solvent in the photoresist material to escape and surface chemistry to form a hardened surface layer. This hardened surface layer minimizes photoresist erosion of high resolution information patterns during the development process. An alternate method to drying the photoresist and forming a hardened surface layer may be affected by baking the material-coated disc. It has been found, however, that the photoresist material generally loses sensitivity after baking.

After the hardened surface layer forms on the surface of the photoresist-coated disc, the disc is positioned on the turntable under the scanning electron microscope for exposure to the video signal modulated electron beam. Disc rotation is set at about 10 rpm and the electron beam adjusted for 10,000 volts accelerating voltage. The beam current is adjusted to provide a focused beam spot size of about 0.3 microns at the half intensity points. During the signal information recording process, the electron beam is precisely focused upon the disc providing a small electron beam spot size suitable for high resolution recording within the previously formed spiral groove.

Frequency modulation of the electron beam is typically utilized for recording signal information on the disc. In response to the frequency modulation, the electron beam is caused to successively traverse the groove region of the disc exposing a pattern of elemental slots. The photoresist-coated disc is then developed to remove photoresist material in the exposed regions on the disc, while leaving a residuum of photoresist material over the surface of the disc. Development time is approximately 120 seconds in Shipley No. AZ1350 developer. The resulting profile of a typical slot is about 0.35 microns wide, 0.3 microns deep, and 6 microns long. Slot profile will vary between the conditions of underexposing and overexposing the electron beam sensitive resist. When the photoresist material is underexposed, a shallow depression results, whereas if the photoresist material is overexposed, a pear-shaped profile may result. Pear-shaped slot profiles are undesirable in that they create a problem in replication as was discussed above. The undercut pear-shaped slots inhibit release of the metal coating applied to the disc in the replication process and therefore should be avoided.

Underexposed slots in the disc provide insufficient depth for good signal-to-noise ratio in the resultant embossed playback disc. A desirable slot profile may be obtained by adjusting the exposure to provide greatest electron beam penetration without undercutting.

After the disc has been developed and signal-representative topography formed in the spiral groove, the disc is replicated in material such as nickel. This nickel replica is a negative of the photoresist-coated disc and may be utilized to stamp or emboss vinyl records for use in a signal information playback system.

An alternate approach to providing an embossed vinyl disc employs a double exposure of a grooveless, material-coated disc to the beam of the scanning electron microscope. The first exposure forms the spiral groove and the second exposure forms the information representative topography.

In this approach, an aluminum disc is machined to a tolerance of about 0.0002 inches and a coating of electron beam sensitive material is applied thereto. Application of this electron beam sensitive material to the aluminum disc surface may be implemented by a spin technique such as the one described in the aforementioned patent application in the names of Robert Michael Mehalso et al. A coating of about 5 micron thickness is desirable in order to provide sufficient thickness for allowing a residuum of material to remain after forming both the spiral groove and information representative topography. For purposes of forming the spiral groove, it is desirable to expose a photoresist having uniform solvent content throughout the material and without a hardened, low solvent surface layer as utilized for forming the high resolution topography. Under such conditions a uniform groove may be formed to a greater depth than could be formed if the surface layer, for example, were of lower solvent content and hardened from effects of surface chemistry.

If the electron beam sensitive material coating applied to the disc is Shipley No. AZ1350 photoresist, the following drying technique is utilized. After application and spin drying of the photoresist material, the disc is placed on a rack and allowed to dry in the open air under standard temperature and humidity conditions for about 20 hours. The coated disc is then removed from the rack and placed in a sealed container of approximately twice its volume. Within a period of time of approximately one to four days the vapor pressure within the container caused by the outgassing solvent reaches an equilibrium, inhibiting further outgassing of solvent. At this point in time the solvent maintains a substantially homogeneous distribution throughout the material. The coated disc is then placed on a turntable for subsequent exposure to the electron beam of a scanning electron microscope.

If Shipley No. AZ1350 photoresist is employed as the electron beam sensitive material, it has been found that a spiral groove suitable for recording video information therein may be formed in the following manner. The photoresist coated disc is positioned on a turntable under a scanning electron microscope and rotated at a speed of about 10 rpm. Accelerating voltage of the electron beam of the scanning electron microscope is adjusted to overexpose the photoresist by using, for example, approximately 15,000 volts at a beam current of about $5 \times 10^{-8}$ amperes. The electron beam is first foccused on the surface of the coated disc and then defocused to enlarge the beam to a size sufficient to form the desired groove width. For example, a 10 micron wide groove width is obtained by reducing the current through the focusing lens of the scanning electron microscope from the amount necessary to precisely focus the electron beam on the surface of the disc by about $15 \times 10^{-3}$ amperes. A spirial exposure may then be effected by impinging the rotating disc with the defocused beam while causing the electron beam to linearly traverse a portion of the disc along a radial. By properly adjusting the intensity and focus of the electron beam and developing the material in a highly erosive developer, a resultant spiral groove may be created having a cross-sectional groove shape of substantially constant radius of curvature.

After the photoresist-coated disc is exposed a first time with the electron beam, the exposed surface is eroded away by a very active hybrid developing solution. This developing solution is made by mixing 95% of Shipley No. AZ1350 developer with 5% of Shipley No. AZ303 developer. Development time in this very active hybrid developer is about two minutes. The active developer serves the multiple purpose of dissolving the exposed regions and eroding the surface of the unexposed regions of the coated disc. Surface erosion in the unexposed regions is generally to a depth of about 0.5 microns and serves the primary purpose of removing the upper portion of the overexposed, pear-shaped spiral groove and forming thereby a groove having substantially circular cross-section.

As described in the method above, the grooved disc is now stored for several days on an open rack in an atmosphere of standard temperature and humidity conditions for purposes of forming a low solvent hardened surface layer. After the hardened surface layer of nominally 0.5 microns thickness has formed, the disc is ready for exposure to the signal modulated electron beam of the scanning electron microscope.

The photoresist coated disc is then repositioned on the turntable under the scanning electron microscope and a signal representative topography formed in the grooved regions of the disc in the manner described in the preceding example. Once again, a metal replica may be made of the groove topography and this metal replica, having opposite contour from that of the photoresist coated disc, may be utilized to stamp or emboss vinyl records for use in a signal information playback system.

What is claimed is:
1. A method of forming an information storing medium comprising the steps of:
    forming upon a first disc substrate, a spiral-grooved surface having peak, valley and wall regions covered with a continuous coating of electron beam sensitive material;
    forming a topography in said spiral groove representative of information to be stored by exposing said spiral groove to an electron beam modulated according to said information such that said electron beam does not pierce completely through said continuous coating to said substrate to thereby avoid overexposure of said coating by electron beam reflection off said substrate, and removing portions of said material in accordance with the pattern of exposure such that said wall and valley regions of said spiral groove include a continuous residuum of said material therein; and
    replicating said exposed disc to form a second disc having a groove topography of opposite contour from that of said first disc, wherein said second disc is suitable to produce positive replicas of said signal modulated grooved disc.

2. A method according to claim 1 wherein:
    said step of forming a first disc comprises inscribing a spiral groove in a substrate and coating the resultant groove region with electron beam sensitive material.

3. A method according to claim 2, wherein:
    said spiral groove is formed with a pitch of about 2000 to 8000 convolutions per inch; and
    said electron beam sensitive material is coated on said grooved substrate by applying an excess of electron beam sensitive material onto said grooved substrate and spinning said substrate at a speed sufficient to throw off excess electron beam sensitive material while allowing a relatively uniform thickness of material coating to remain in the valley region of said spiral groove.

4. A method according to claim 3 wherein:
    the thickness of said electron beam sensitive material in the regiion to be exposed exceeds the depth of penetration of said electron beam.

5. A method according to claim 1 wherein:
    said step of forming a topography in said spiral groove includes developing the material coating of said first disc subsequent to exposure by said electron beam to remove portions of electron beam sensitive material that have been exposed by said electron beam.

6. A method according to claim 1 wherein:

said first disc comprises a grooveless substrate uniformly coated with electron beam sensitive material; and said spiral groove is formed in said coated substrate at least in part by exposing a spiral pattern in said electron beam sensitive material coating with an electron beam.

7. A method according to claim 6 wherein:

said exposed electron beam sensitive coating is developed to remove exposed regions of electron beam sensitive material forming thereby a dimensional spiral groove in said material.

8. A method according to claim 1 wherein:

said material coating thickness prior to recording just coats the peaks of said groove surface and is at least 50% thicker in said valley region than the penetration depth of said electron beam.

9. A method according to claim 8 wherein:

said material coating thickness prior to recording is not greater than 6 microns at the deepest valley region of said groove surface.

10. A method of forming an information storing medium comprising the steps of:

forming upon a first disc substrate, a spiral-grooved surface having peak, valley and wall regions covered with a continuous coating of electron beam sensitive material;

forming a topography in said spiral groove representative of information to be stored by exposing said spiral groove to an electron beam modulated according to said information such that said electron beam does not pierce completely through said continuous coating to said substrate to thereby avoid overexposure of said coating by electron beam reflection off said substrate; and developing said exposed groove to remove portions of said material in accordance with the pattern of exposure such that the wall and valley regions after developing includes a continuous residuum of said material therein.

11. A method according to claim 10 wherein:

said material coating thickness prior to recording is not greater than 6 microns at the deepest valley region of said groove surface.

12. A method of forming an information storing medium comprising the steps of:

forming upon a first disc substrate, a spiral-grooved surface having peak, valley and wall regions covered with a continuous coating of electron beam sensitive material;

exposing said spiral groove to an electron beam modulated according to information to be stored such that said electron beam does not pierce completely through said continuous coating to said substrate to thereby avoid exposure of said coating by electron beam reflection off said substrate; and forming a topography in said spiral groove representative of said information by developing said exposed groove to remove portions of said material in accordance with the pattern of exposure, the thickness of said material in the wall and valley regions of said groove prior to said developing, the depth of electron beam penetration into said material during said exposing, and the degree of said developing being so related that the wall and valley regions after developing include a continuous residuum of said material therein.

13. A method according to claim 12 wherein:

the depth of electron beam penetration into said material does not exceed 50% of the material thickness in the valley region of said groove.

* * * * *